Oct. 17, 1933.                    J. COLTHARP                    1,930,893
                         IMPLEMENT HITCH FOR CULTIVATORS
                              Filed May 23, 1933            2 Sheets-Sheet 1

Inventor
James Coltharp

By Mason Fenwick & Lawrence
                Attorneys

Oct. 17, 1933. J. COLTHARP 1,930,893
IMPLEMENT HITCH FOR CULTIVATORS
Filed May 23, 1933 2 Sheets-Sheet 2
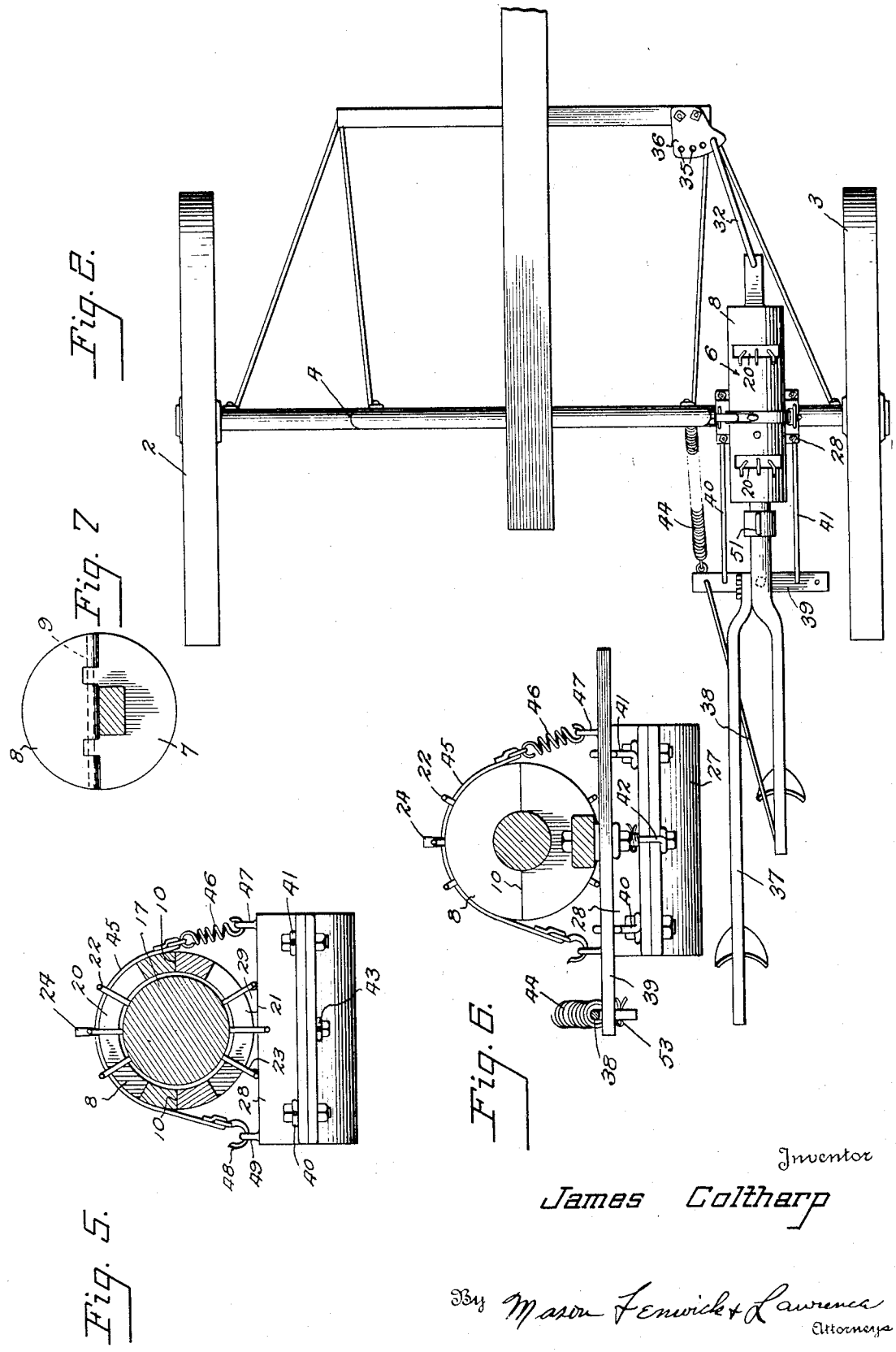

UNITED STATES PATENT OFFICE 1,930,893

IMPLEMENT HITCH FOR CULTIVATORS

James Coltharp, Blue Mountain, Miss.

Application May 23, 1933. Serial No. 672,507

6 Claims. (Cl. 97—199)

This invention relates to an implement hitch for cultivators and it has for its general object the provision of a hitch capable of performing all the desired functions of a hitch such as adjusting the implement to or from the row, giving it any desired angle of lateral tilt, holding the implement to the ground and permitting it to be lifted clear of the ground, and characterized particularly by strength, simplicity of construction, and the quickness and celerity with which the implement may be detached from the cultivator frame.

Other objects of the invention will appear as a preferred and practical embodiment thereof proceeds.

In the drawings which accompany and form a part of the specification and throughout the several figures of which the same characters of reference have been employed to designate identical parts:

Figure 1 is a side elevation of a cultivator frame showing my improved hitch in operative relation to an implement;

Figure 2 is a plan view of the same;

Figure 3 is a view in longitudinal section through my improved hitch;

Figure 4 is a cross section taken along the line 4—4 of Figure 3;

Figure 5 is a cross section taken along the line 5—5 of Figure 3;

Figure 6 is a cross section taken along the line 6—6 of Figure 3; and

Figure 7 is a section taken along the line 7—7 of Figure 3.

Referring now in detail to the several figures, the numeral 1 represents the frame of a cultivator, the ends of which constitute in customary manner axles for the wheels 2 and 3. The frame is angularly bent so as to form a high arch 4 in the middle with downwardly extending limbs 4 near the ends terminating in outwardly directed U-shaped extensions 5 which terminate in the axles, all this being of conventional construction. The frame in the region of one of the U-shaped extensions is utilized as the point of attachment of the hitch as is clearly illustrated in Figures 2 and 4.

The hitch comprises a casing 6 constructed of a base section 7 and a lid section 8, said sections being hingedly connected as at 9 toward the forward end of the hitch. The two sections preferably come together substantially in the plane of the axis of the hitch and of the implement beam, the line of separation being indicated at 10 in Figures 3 and 4. The sections 7 and 8 enclose a bore or chamber 11 having enlarged portions 12 and 13. The walls of this chamber form a seat for the beam head of the implement, said beam head comprising cylindrical portions 14 and 15 of relatively small diameter preferably snugly received in that part of said chamber of smaller cross section and being provided with spaced collars 16 and 17 which occupy the enlarged portions of said chambers. Said collars afford shoulders 18 and 19 which bear against corresponding shoulders formed by the walls of the enlarged portions of said chamber and constitute thrust members for transmitting the pull of the hitch to the implement.

The enlarged portions 12 and 13 of the chamber within the casing are of greater longitudinal dimension than the width of the collars 16 and 17 to permit the implement beam head to be backed up when occasion requires as an operation incident to its detachment. Both the base and the lid of said casing are provided with circumferential slots 20 and 21, see Figures 3 and 5, through which project one or more pins 22 and 23. Said pins, it will be observed, are sufficiently long to extend beyond the outer edges of the slots 20 and 21 and they incline away from the source of power so that when pull is put upon the hitch, the casing members cam against said pins in a direction which brings them closer together and prevents inadvertent separation of the lid and base elements of said casing.

Forward movement of the implement beam head during operation of the hitch is normally prevented by a pin 24 extending through a bore 25 in the lid member of said hitch and which may be pushed into any one of a plurality of depressions 26 in the implement beam head, thus holding the pins 22 and 23 in locked relation to the upper end lower members of said casing. It is frequently desired to have the implement assume an angular relation to the row under cultivation, and this angular relation is obtained and maintained by twisting the implement beam head through the desired angle and pushing the pin 24 into the desired depression 26. The width of the slots 20 and 21 exceeds the arc defined by the series of pins 22 and 23 sufficiently to permit this angular adjustment of the implement beam head.

The hitch is mounted upon the U-shaped extension of the frame by means of a pair of cooperating bracket members 27 and 28 bolted or otherwise secured about said frame in such manner as to be readily tilted upon said frame. The upper bracket member 28 is provided in its central portion with an upstanding cylindrical boss 29 fitting into a similarly shaped recess 30 on the bottom of the base member 7 of the casing and forming a pivotal support for said casing member. A bolt 31 passing through said boss and through said casing member secures these parts rotatably together. A rod 32 has an angular end 33 fitting through a hole 34 in the forward end of the base member 7 of the casing, the opposite end of said rod being selectively insertable in a plurality of holes 35 formed in a plate 36 substantially secured in fixed manner to any fixed part of the cultivator. The object of the rod 32 is to turn the hitch about the boss 29 as a pivot and thus to throw the implement 37 towards or away from the row.

The foot of the implement is held into the ground by means of a rod 38 connected to the implement adjacent its lower portion and to one side of a transverse bar 39 pivotally connected to the rear end of the lower member 7 of the hitch casing. Said transverse member is in turn connected by parallel links 40 and 41 with the bracket member 28. Thus a jointed parallelogram is formed which not only affords a steadying support to the lower hitch, but causes the foot of the implement to track with the cultivator and also permits the shovel or other tool at the foot of the implement to yield to the right or left to immovable obstructions in the ground without imposing strain upon the hitch.

Since considerable strain may come upon the transverse bar 39, it is braced from beneath by the rod 42 which is swivelly connected to the pivot bolt of said transverse bar 39 as well as to a bolt 43 projecting from the underneath surface of the bracket member 27. A spring 44 connects the transverse bar 39 with any fixed part of the cultivator and interposes a resilient resistance to shocks and movements transmitted by the implement, so as to materially diminish the strains to which the hitch would otherwise be subjected.

Although normally the pins 22 and 23 may be relied upon to keep the casing parts 7 and 8 together and thus to prevent the implement beam head from becoming inadvertently disassembled, yet to avoid the possibility of these parts becoming separated when the implement is backed up, a strap 45 containing a resilient limb 46 may be passed around the lid of the casing, said strap being anchored to an eye 47 in the bracket member 28 and having a hook 48 at its opposite end adapted to be engaged with an eye 49 formed on the opposite side of said bracket member.

The operation of the hitch is extremely simple. When it is desired to raise the implement from the ground, a single cotter pin 50 is taken out of the front end of the rod 32 so as to release said rod. The implement is then manually lifted, the hitch tilting about the U-shaped extension 5 of the cultivator frame until the eye 51 can be placed upon a hook 52.

When it is desired to detach the implement it is merely necessary to take out the single cotter pin 53, see Figure 6, at the upper end of the rod 38 and then to unhook the strap 45. The implement is shoved forward so as to bring the pins 22 and 23 in the clear with relation to the slots 20 and 21. The lid member 8 of the casing is then swung to an open position, in which position the implement beam head may be freely lifted out of the lower casing member 7.

It is thus obvious that this operation which in the case of an ordinary hitch takes an hour or more to complete, is accomplished by the present hitch in a few minutes.

While I have in the above description disclosed what I believe to be a preferred and practical embodiment of the invention, it will be understood that the details of construction as illustrated and described are merely by way of example and not to be construed as limiting the scope of the invention as claimed.

What I claim is:

1. An implement hitch comprising a support revolubly mountable on a horizontal member of a cultivator, a housing pivotally mounted on said support to swing laterally, said housing including upper and lower members hingedly connected at their forward ends and defining when closed a chamber, and an implement beam having a head portion seated in said chamber, and having an enlargement fitting a correspondingly enlarged portion of said chamber by means of which the pull of the cultivator is transmitted to said implement.

2. An implement hitch comprising a support revolubly mountable on a horizontal member of a cultivator, a housing pivotally mounted on said support to swing laterally, said housing including upper and lower members hingedly connected at their forward ends and defining when closed a chamber, and an implement beam having a head portion seated in said chamber, said head portion having an enlargement fitting a correspondingly enlarged portion of said chamber for transmitting the pull of the cultivator to said implement, said housing having transverse slots and the head portion of said beam being provided with elements extending through said slots when said housing is closed and inclined rearwardly, engaging the rearward walls of said slots when said hitch is under tension for biasing the members of said hitch toward closed position.

3. An implement hitch comprising a support revolubly mountable on a horizontal member of a cultivator, a housing pivotally mounted on said support to swing laterally, said housing including upper and lower members hingedly connected at their forward ends and defining when closed a chamber, an implement beam having a head portion, seated in said chamber and angularly adjustable with respect to the axis of said beam, said head portion having an enlargement fitting a correspondingly enlarged portion of said chamber for transmitting the pull of the cultivator to said implement, and means for adjustably fixing said beam in any angular position with respect to said housing.

4. An implement hitch comprising a support revolubly mountable on a horizontal member of a cultivator, a housing pivotally mounted on said support to swing laterally, said housing including upper and lower members hingedly connected at their forward ends and defining when closed a chamber, an implement beam having the head portion seated in said chamber having an enlargement fitting a correspondingly enlarged portion of said chamber for transmitting the pull of the cultivator to said implement, means for angularly adjusting said beam to said hitch with respect to the axis of said beam comprising a radial bore in said housing selectively alinable with one of a plurality of radial depressions in said beam head portion, and a pin slidable in interlocking relation within said bore and the selected one of said depressions.

5. An implement hitch comprising a support revolubly mountable on a horizontal member of a cultivator, a housing pivotally mounted on said support to swing laterally, said housing including upper and lower members hingedly connected at their forward ends and defining when closed a chamber, an implement beam having a head portion seated in said chamber, said head portion having an enlargement fitting a correspondingly enlarged portion of said chamber for transmitting the pull of the cultivator to said implement, said beam head portion being released by opening the upper hinged member of said housing, and means for adjusting said hitch laterally about the pivotal axis of said housing for bringing the implement closer to or farther from the row comprising a rod attached to the forward end of said hitch and a bracket having a plurality of holes fixed to said cultivator, the end of said rod being adapted for selective insertion in any one of said holes.

6. An implement hitch comprising a support revolubly mountable on a horizontal member of a cultivator, a housing pivotally mounted adjacent the middle of said support, the latter extending on both sides of said housing, said housing including upper and lower members hingedly connected at their forward ends and defining when closed a chamber, an implement beam having a head portion seated in said chamber, said head portion having an enlargement fitting a correspondingly enlarged portion of said chamber for transmitting the pull of the cultivator to said implement, a transverse bar pivoted to the rear portion of said hitch, parallel links pivotally connecting the opposite ends of said transverse bar with the opposite sides of said support, and a rod detachably connected to said transverse bar laterally of the pivotal connection thereof, and to the foot of said implement.

JAMES COLTHARP.